United States Patent
Bartoli et al.

(10) Patent No.: US 9,708,118 B2
(45) Date of Patent: Jul. 18, 2017

(54) CAPSULE FOR BEVERAGE HAVING A BASE WALL STIFFENING ELEMENT

(71) Applicant: Sarong Societa' per Azioni, Reggiolo (IT)

(72) Inventors: Andrea Bartoli, Reggio Emilia (IT); Flavio Traldi, San Prospero (IT)

(73) Assignee: Sarong Societa' per Azioni (IT)

( * ) Notice: Subject to any disclaimer, the term of this patent is extended or adjusted under 35 U.S.C. 154(b) by 142 days.

(21) Appl. No.: 14/370,342

(22) PCT Filed: Jan. 9, 2013

(86) PCT No.: PCT/IB2013/050195
§ 371 (c)(1),
(2) Date: Jul. 2, 2014

(87) PCT Pub. No.: WO2013/105038
PCT Pub. Date: Jul. 18, 2013

(65) Prior Publication Data
US 2014/0342060 A1 Nov. 20, 2014

(30) Foreign Application Priority Data
Jan. 12, 2012 (IT) .............................. MO2012A0007

(51) Int. Cl.
*B65D 85/804* (2006.01)
*A47J 31/02* (2006.01)

(52) U.S. Cl.
CPC ........... *B65D 85/8043* (2013.01); *A47J 31/02* (2013.01)

(58) Field of Classification Search
CPC ... B65D 85/804; B65D 85/8043; A23F 5/262; A23F 5/265; A23F 5/267; A47J 31/02
USPC ... 426/77, 78, 79, 82, 84, 86, 110, 112, 115, 426/106, 122
See application file for complete search history.

(56) References Cited

U.S. PATENT DOCUMENTS

| | | | |
|---|---|---|---|
| 8,833,235 B2 * | 9/2014 | Fabozzi | B29C 45/0046 206/459.5 |
| 2003/0172813 A1 | 9/2003 | Schifferle | |
| 2006/0236871 A1 * | 10/2006 | Ternite | B65D 85/8043 99/295 |
| 2009/0126577 A1 | 5/2009 | Ternite | |
| 2010/0180775 A1 * | 7/2010 | Kollep | B65D 85/8043 99/295 |
| 2010/0260896 A1 * | 10/2010 | Yoakim et al. | 426/77 |

(Continued)

FOREIGN PATENT DOCUMENTS

| | | | | |
|---|---|---|---|---|
| DE | 202009009127 U1 | 10/2010 | | |
| EP | 2284100 A1 * | 2/2011 | ........... | B65D 85/804 |

(Continued)

*Primary Examiner* — Drew Becker
*Assistant Examiner* — Bryan Kim
(74) *Attorney, Agent, or Firm* — Laubscher, Spendlove & Laubscher, P.C.

(57) ABSTRACT

A capsule includes a casing provided with a base wall and with a side wall defining an open cavity for containing a product to be combined with a fluid to produce a final product. The base wall has such a thickness as to be perforable. The capsule further includes a stiffening element connected with an inner surface of the base wall within the cavity to stiffen the base wall. The base wall includes at least one through opening at a preset portion to be perforated for the outflow of the final product.

10 Claims, 2 Drawing Sheets

(56) References Cited

U.S. PATENT DOCUMENTS

| | | | | |
|---|---|---|---|---|
| 2010/0303964 A1* | 12/2010 | Beaulieu | ............ | B65D 85/8043 426/77 |
| 2011/0142996 A1* | 6/2011 | Kruger | ............... | B65D 85/8043 426/80 |
| 2011/0186450 A1* | 8/2011 | Bonacci | ........................ | 206/219 |
| 2015/0050391 A1* | 2/2015 | Rapparini | ............... | A23F 5/262 426/115 |

FOREIGN PATENT DOCUMENTS

| | | | | |
|---|---|---|---|---|
| EP | 2287090 A1 | | 2/2011 | |
| EP | 2420374 A1 * | | 2/2012 | ............ B29C 45/14 |
| FR | 2946854 A3 | | 12/2010 | |
| WO | 2005066040 A2 | | 7/2005 | |
| WO | 2006045537 A1 | | 5/2006 | |

* cited by examiner

CAPSULE FOR BEVERAGE HAVING A BASE WALL STIFFENING ELEMENT

This application is a §371 National Stage Entry of PCT International Application No. PCT/IB2013/050195 filed Jan. 9, 2013. PCT/IB2013/050195 claims priority to IT Application No. MO2012A000007, filed Jan. 12, 2012. The entire contents of these applications are incorporated herein by reference.

The invention relates to capsules or containers for preparing beverages in automatic dispensing machines, particularly, it relates to a single-dose and disposable sealed capsule containing a percolable or soluble product or an infusion product, capable of making a beverage by interacting with a pressurized fluid, typically water or milk.

The known capsules for use on known dispensing machines are disposable and single-dose containers including an outer casing made of a liquid- and gas-impermeable plastic material and having the shape of a glass or cup. The casing has a bottom wall and a side wall defining a cavity provided with an upper opening through which the product from which the beverage can be produced or final product can be inserted. The upper opening is hermetically sealed by a cover element, typically an aluminium film or a plastic film, so as to seal the product within the container. The capsule is perforable to allow the insertion of a pressurized fluid, typically a liquid such as water, and the outflow of the beverage. In particular, the cover element and the bottom wall of the casing are perforable by an injection device and by an extraction device of the dispensing machine into which the capsule is inserted, respectively, to allow the insertion from the top of the pressurized liquid and the extraction from the bottom of the beverage.

The injection device and the extraction device typically include one or more pointed needles or nozzles capable of perforating the capsule.

While perforating the cover element is easy and simple as the latter is composed of an aluminium film or a thin plastic film, perforating the bottom wall of the capsule can be more problematic, needing appropriate measures.

In the known capsules made by a thermoforming process of a plastic material sheet, if the thickness of the walls of the casing, and therefore of the bottom wall, is high, the extraction needles are not able to perforate the material. If, vice versa, the thickness is reduced, the capsule casing is easily deformable, and in particular the bottom wall is deformable and yielding when the extraction needles abut on it, which extraction needles cannot therefore perforate it.

To this aim, capsules are used, having a bottom wall that is already provided with a dispensing hole (obtained during the thermoforming process) that is closed by a closing element, for example, an aluminium film or a plastic film, which can be easily perforated by the extraction needles.

However, the manufacturing process and the so-obtained capsule are more expensive, due to the need of providing and fixing an additional closing element.

Furthermore, such capsules cannot be used when the liquid has to be injected into the capsule at high pressures, which can determine the tearing or detachment of the closing element.

Alternatively, capsules are used that are produced by means of injection moulding processes allowing to produce reduced portions of the capsule (in the specific case of the bottom wall) having a reduced thickness and such mechanical characteristics as to allow an easy perforation or etching thereof. However, such capsules, due to the process and the plastic material to be used for the injection, are particularly expensive.

US2003/172813 discloses a capsule containing a single serving of a particulate substance extractable by means of water for preparing a beverage. Between the bottom of the capsule and the particulate substance as well as between the particulate substance and the cover of the capsule, a fluid director member is provided, having a plurality of small openings. The fluid director member close to the cover serves as a water distribution member for distributing the water, fed into the capsule through a central opening made by piercing the capsule, evenly over the particulate substance; the fluid director member close to the bottom serves as a collection member to lead the beverage to a central opening pierced into the bottom of the capsule.

US2006/236871 discloses a single portion capsule, which is suitable for brewing one portion of a coffee beverage and comprises a lid and a base and it is closed on all sides. The capsule contains a particulate beverage substance which can be extracted by means of water. Between the cover and the beverage substance a distributing device is provided, and/or between the beverage substance and the base a filter device is provided. The distributing device and/or the filter device have a supporting structure, which is provided with at least one opening, which is covered by a textile fabric.

US2009/126577 discloses a coffee machine for brewing a hot beverage by using a capsule provided with a lid and a base, the coffee machine including a water pressurizing device, a capsule holder and a controller. The capsule holder is provided with two relatively-displaceable perforating devices, which pierce the capsule lid and the capsule base on or after insertion of the capsule in the capsules holder, such that hot water can enter the capsule through the lid and the beverage flows outwardly through the base. The capsule base can include a weakening portion.

WO2005/066040 discloses a capsule for the preparation of beverages comprising an enclosure suitable for forming a sealed container within which a dose of preparation for the production of a beverage is contained. The enclosure comprises a first weakened area suitable to be perforated by a pressurized liquid acting on the outside of said capsule and a second area suitable to be broken through the effect of the pressure exerted thereupon by the beverage present within the capsules.

An object of the present invention is to improve the known capsules for beverages, particularly the capsules made by a thermoforming process and containing a product to be combined with an injected fluid to prepare an final product in an automatic dispensing machine.

Another object is to obtain a disposable, single-dose sealed capsule that is easily perforable by a suitable device of a dispensing machine.

A further object is to obtain a strong and stable capsule that can be used also with high pressures and temperatures of the injected fluid.

Such and other objects are achieved by a capsule according to one or more of the claims set forth below.

The invention will be able to be better understood and implemented with reference to the attached drawings, which illustrate some illustrative, non-limiting embodiments thereof, in which.

Figure 1:
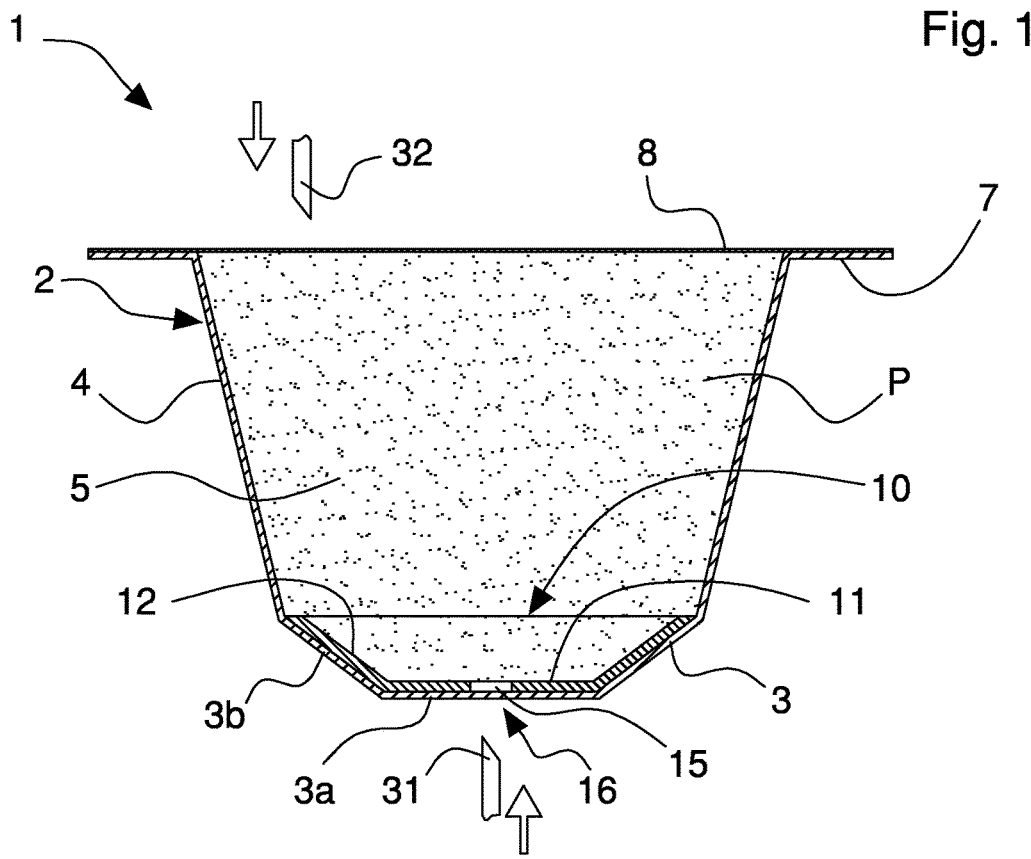
FIG. 1 is a schematic cross-section of a capsule according to the invention.
Figure 2:
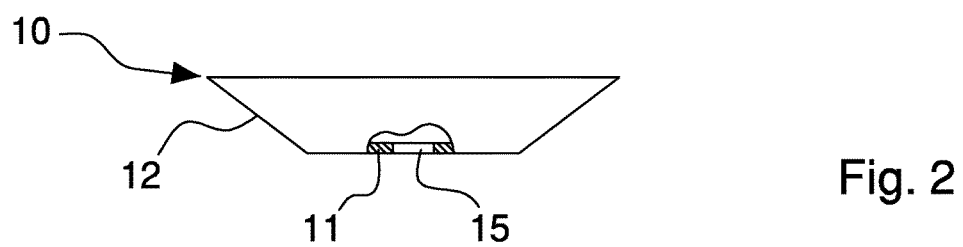
FIG. 2 is a partially sectioned front view of a stiffening element of the capsule of FIG. 1.
Figure 3:
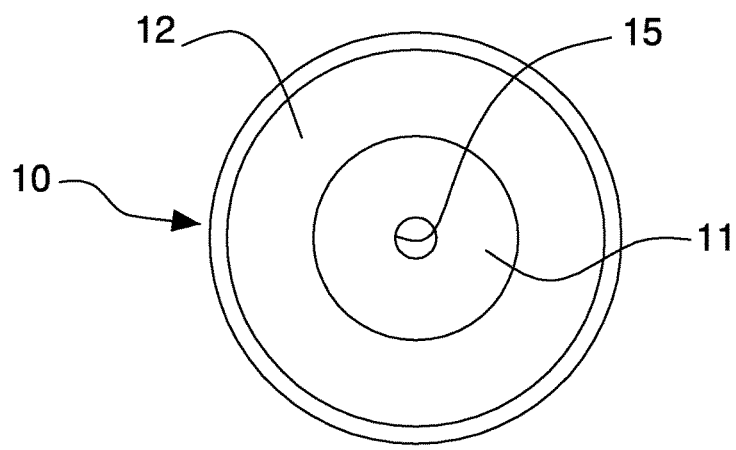
FIG. 3 is a top plan view of the stiffening element of FIG. 2.

With reference to FIGS. 1 to 3, a capsule 1 according to the invention is illustrated, containing a product P usable in a dispensing machine to produce a final product, typically a hot beverage, for example, coffee, barley, infusion, tea chocolate, etc., by injection of a pressurized fluid therein, typically hot water.

The capsule 1 comprises a casing 2 or container, which is substantially cup or glass shaped and is provided with a base wall 3 and with a side wall 4 defining a cavity 5 that is open and suitable to contain the product P to be combined with the fluid to make the final product.

The casing 2 is obtained by forming a sheet of thermoformable material, in particular a liquid- and gas-impermeable multilayered plastic material and suitable for the contact with foods.

At least the base wall 3 has a reduced thickness so as to be easily and efficiently perforable by an extraction device of a dispensing machine.

The capsule 1 further comprises a stiffening element or reinforcement 10 fixed within the cavity 5 to an inner surface of the base wall 3 to stiffen and reinforce the latter. The stiffening element 10 is made of plastic material.

The stiffening element 10 is fixed to the base wall 3, for example, by welding, particularly thermowelding or ultrasonic welding.

The stiffening element 10 is provided with at least one through opening 15 aligned with a preset perforable portion 16 of the base wall 3, such perforable portion 16 being arranged to be perforated by an extraction device of a dispensing machine, of a known type and not illustrated in the figures, to enable the final product to flow outwardly.

The base wall 3 comprises a first central portion 3a and a second peripheral portion 3b, the latter being interposed between the first portion 3a and the side wall 4.

In the illustrated embodiment, the first central portion 3a is substantially flat, and the second peripheral portion 3b has a substantially frusto-conical shape.

However, the base wall 3 may have any shape, for example, the shape of a cap or a truncated pyramid.

The side wall 4 is divergent starting from the base wall 3 to a peripheral edge 7 of the casing 2 at the opening of the cavity 5.

The side wall 4 is, for example, also in a frusto-conical shape.

The stiffening element 10 comprises a first wall 11 and a second wall 12 having the same thickness and intended to abut respectively on the first portion 3a and the second portion 3b of the base wall 3.

In the embodiment illustrated in the figures, the stiffening element 10 has a substantially frusto-conical shape, complementary to the shape of the base wall 3 and comprises only one through opening 15 made in the first wall 11, the portion to be perforated 16 being comprised in the first portion 3a of the base wall 3.

The capsule 1 is provided with a cover element 8 connected with the edge 7 of the casing 2 to hermetically close the cavity 5. The cover element 8 is perforable by an injection device of the dispensing machine, and includes an aluminium film or a plastic film.

The capsule 1 of the invention can be used in a dispensing machine of a known type and not illustrated in detail in the figures, including an injection device 32 of the fluid and an extraction device 31 of the final product provided with respective needles or similar members that are capable of perforating the cover element 8 and the base wall 3, respectively.

The injection device 32 (injection needles) leads the fluid into the cavity 5, so that it can interact with the initial product P to form the final product, typically, a beverage.

The extraction device 31 includes, for example, an extraction needle capable of perforating the base wall 3 at the portion to be perforated 16 below which there is the through opening 15 of the stiffening element 10. In this manner, the extraction needle 31 can easily perforate the thickness of the base wall 3 and enter the cavity 5, through the abovementioned through opening 15. At the same time, the stiffening element 10 fixed, particularly welded, to the base wall 3, impart stiffness to the latter, so that the extraction needle 31 can pierce the base wall 3 without the latter being deformed or deflected. In other words, the stiffening element 10 acts as a die, while the extraction needle 31 acts as a punch during the perforation of the base wall 3.

Owing to the capsule 1 of the invention provided with the stiffening element 10, the casing 2, i.e. the base wall 3 and the side wall 4, can be made by thermoforming a sheet material having a reduced thickness without the risk that the base wall 3 deforms, without being pierced, when the extraction needle abuts on it, as typically occurs in the known capsules having the same wall thickness and made by thermoforming.

Furthermore, owing to the structure and the mechanical and chemical features of the sheet of plastic materials that can be used for thermoforming the capsule 1 of the invention, the latter, also with reduced wall thicknesses of the casing 2, is stable and resistant during the injection of the fluid also at high pressures and temperatures.

Figure 4:
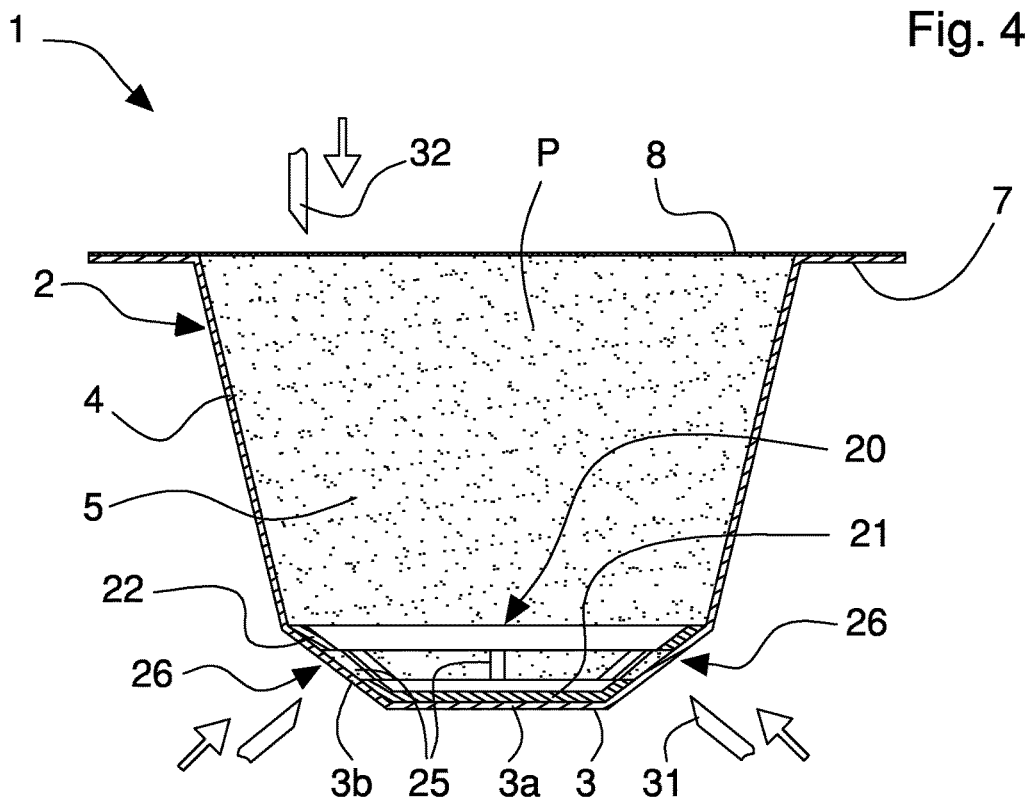
FIG. 4 is a schematic cross-section of a version of the capsule of the invention.
Figure 5:
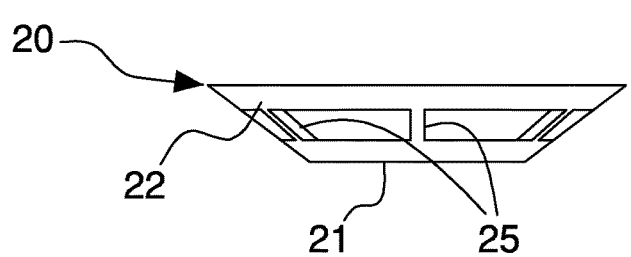
FIG. 5 is a front view of a stiffening element of the capsule of FIG. 4.
Figure 6:
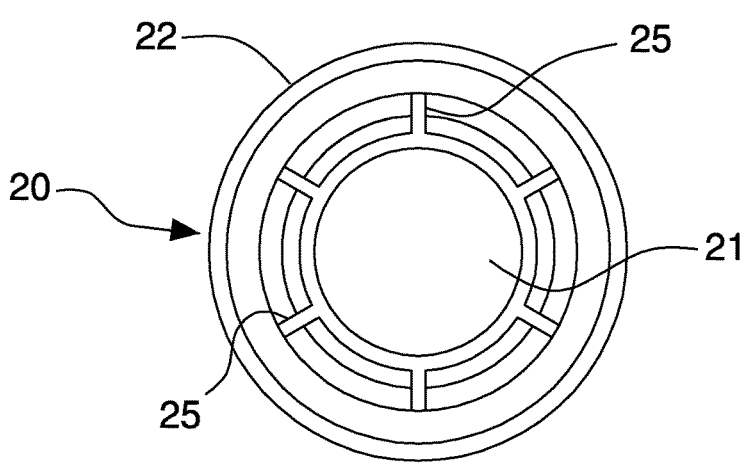
FIG. 6 is a top plan view of the stiffening element of FIG. 5.

FIGS. 4 to 6 illustrate a version of the capsule 1 of the invention, differentiating from the embodiment disclosed above for the different stiffening element 20 and in that the portion to be perforated 26 of the capsule 1 is included in the second peripheral portion 3b of the base wall 3. In this case, the capsule 1 is associated to a dispensing machine provided with a plurality of extraction needles 31 so arranged as to abut on radially the second portion 3b of the base wall 3 and with an inclined direction with respect to a longitudinal axis of the capsule 1.

The stiffening element 20 thus has a shape that is complementary to that of the base wall 3, for example, a substantially frusto-conical shape, and comprises a first wall 21 and a second wall 22 having a same thickness and respectively intended to abut on the first portion 3a and the second portion 3b of the base wall 3.

The stiffening element 20 comprises in this embodiment a plurality of through openings 25 obtained on the second wall 22, so as to allow the passage of the extraction needles 31. The through openings 25 are substantially elongated slots, arranged evenly spaced apart angularly along the second wall 22.

In this manner, the extraction needles 31 can easily perforate the thickness of the base wall 3 and penetrate into the cavity 5, via the through opening 25. In this version of the capsule 1 too, the stiffening element 20 fixed, particularly welded, to the base wall 3 imparts stiffness to the latter, so that the dispensing needles 31 may perforate, at the portion to be perforated 26, the base wall 3 without the latter being deformed or yielded.

The invention claimed is:

1. A capsule, comprising a casing provided with a base wall and with a side wall defining an open cavity and suitable to contain a product to be combined with a fluid to make an final product, said base wall having a perforable thickness and including a first substantially flat portion and a second substantially frusto-conical peripheral portion interposed between said first portion and said side wall, said capsule further comprising a stiffening element arranged completely within said cavity and connected in contiguous relation with an inner surface of said base wall to stiffen and reinforce said base wall, said stiffening element including a first wall and a second wall intended to abut respectively on said first portion and said second portion of said base wall, said stiffening element terminating short of said side wall and containing a through opening aligned with a preset perforable portion of said base wall and having a continuous surface surrounding said through opening so that the thickness of said base wall is perforated via said through opening to define a dispensing end of said casing and deformation of said base wall is prevented by said continuous surface of said stiffening element in contiguous relation therewith.

2. A capsule according to claim 1, wherein said through opening is made in said first wall and said perforable portion is arranged in said first portion of said base wall.

3. A capsule according to claim 1, wherein said through opening is arranged in said second wall and said perforable portion is arranged in said second portion of said base wall.

4. A capsule according to claim 3, wherein said stiffening element comprises a plurality of through openings arranged in said second wall, said through openings being mutually angularly and evenly spaced apart and a remaining portion of said stiffening element defining a continuous surface in contiguous relation with said base wall.

5. A capsule according to claim 1, wherein said base wall and said stiffening element have a substantially frusto-conical shape.

6. A capsule according to claim 1, wherein said stiffening element is connected with said base wall by thermowelding or ultrasonic welding.

7. A capsule according to claim 1, and further comprising a cover element connected with an edge of said casing to hermetically close said cavity, said cover element being perforable.

8. A capsule according to claim 7, wherein said base wall and said cover element are perforable by an extraction device and by an injection device, respectively of a dispensing machine suitable to receive said capsule.

9. A capsule according to claim 1, wherein said casing is obtained by forming of a sheet of a thermoformable material and said stiffening element is made of a plastic material.

10. A capsule, comprising
  (a) a casing including a base wall and a side wall defining an open cavity suitable for containing a product to be combined with a fluid to make a final product, said base wall having a thickness which is perforable and including a first flat central portion and a second frusto-conical peripheral portion arranged between said first portion and said side wall; and
  (b) a stiffening element arranged completely within said cavity and fixed to an inner surface of said base wall to stiffen said base wall, said stiffening element including a first wall and a second wall to abut said first portion and said second portion of said base wall, respectively, said stiffening element containing at least one through opening corresponding with a pre-determined portion of said base wall to be perforated by an extraction device of a dispensing machine to enable the final product to exit said casing via said base wall through opening, said at least one through opening comprising a through opening arranged in one of said first and second walls and said pre-determined portion of said base wall to be perforated being arranged in one of said first and second portions of said base wall, respectively, or said at least one through opening comprising a plurality of through openings arranged in said second wall and said pre-determined portion of said base wall to be perforated comprising a plurality of portions arranged in said second portion of said base wall.

* * * * *